United States Patent
Hodgson (10) Patent No.: US 8,903,920 B1
(45) Date of Patent: Dec. 2, 2014

(54) DETECTION AND PREVENTION OF E-MAIL MALWARE ATTACKS

(75) Inventor: Garren G. Hodgson, Basking Ridge, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 2900 days.

(21) Appl. No.: 11/257,459

(22) Filed: Oct. 24, 2005

(51) Int. Cl.
*G06F 15/16* (2006.01)
*G06F 21/56* (2013.01)
*H04L 29/06* (2006.01)

(52) U.S. Cl.
CPC ......... *H04L 29/06176* (2013.01); *H04L 63/145* (2013.01); *H04L 63/1441* (2013.01); *H04L 65/00* (2013.01); *G06F 21/56* (2013.01)
USPC ........................................ 709/206; 379/93.01

(58) Field of Classification Search
CPC ......... H04L 51/04; H04L 51/08; H04L 51/32; H04L 29/06176; H04L 65/00; H04L 63/1441; H04L 63/145; G06F 21/56
USPC ......................................................... 709/206
See application file for complete search history.

(56) References Cited

U.S. PATENT DOCUMENTS

| | | | |
|---|---|---|---|
| 6,023,723 A | 2/2000 | McCormick et al. | |
| 6,052,709 A | 4/2000 | Paul | |
| 6,076,083 A | 6/2000 | Baker | |
| 6,161,130 A | 12/2000 | Horvitz et al. | |
| 6,321,267 B1 * | 11/2001 | Donaldson | 709/229 |
| 6,493,007 B1 | 12/2002 | Pang | |
| 6,732,157 B1 | 5/2004 | Gordon et al. | |
| 2001/0005889 A1 * | 6/2001 | Albrecht | 713/201 |
| 2003/0023875 A1 * | 1/2003 | Hursey et al. | 713/201 |
| 2004/0034794 A1 | 2/2004 | Mayer et al. | |

OTHER PUBLICATIONS

Schwartz ("Spam Assassin", O'Reilly, Jul. 2004, pp. 1-256).*
Hodgson ("McAfee SpamKiller Makes Intelligent Decisions About Email With Bayesian Filtering", 2003, pp. 1-2).*
Schwartz ("Spam Assassin", O'Reilly, Jul. 2004, chapters 1, 2 and 7).*
"Microsoft Computer Dictionary", Microsoft Press, 2002, fifth edition, section M retreived on Nov. 4, 2010 from http://proquest.safaribooksonline.com/0735614954.*
Williamson, M., Throttling Viruses: Restricting propagation to defeat malicious mobile code, ACSAC'02, 2002 IEEE.
Weaver, N., A Taxonomy of Computer Worms, WORM'03, Oct. 27, 2003, Washington, DC.

(Continued)

*Primary Examiner* — Jude Jean Gilles
*Assistant Examiner* — Jaren M Means
(74) *Attorney, Agent, or Firm* — Fay Kaplun & Marcin, LLP (57) ABSTRACT

A method for inhibiting infection of network destinations by malware comprising detecting behavior consistent with the presence of malware at first network clients, such as access by a message received at a first network client to addressing resources containing an address of a malware evaluator. Detecting malware at the first clients is advantageously accomplished at one or more malware evaluators by receipt of messages forwarded from the first network clients, the forwarded messages comprising selectively flagged information relating to malware suspicions. Malware evaluators advantageously comprise a Bayesian Learning Network trained with knowledge of malware characteristics and forwarded messages. The malware evaluators, when adequately trained, provide classifications of received messages as malware or not, with at least a predetermined likelihood. Results of such classification can be selectively made available to network clients, including the first network clients.

18 Claims, 6 Drawing Sheets

(56) References Cited

OTHER PUBLICATIONS

Androutsopoulos, et al, An Experimental Comparison of Naive Bayesian and Keyword-Based Anti-Spam Filtering with Personal E-Mail Messages, SIGIR 2000, Jul. 2000 Athens, Greece.

Soonthornphisau, et al, Anti-Spam Filtering: A Centroid-Based Classification Approach, ICSP'02 Proceedings, 2002 IEEE.

GFI, Why Bayesian filtering is the most effective anti-spam technology, GFI Software Ltd., 2005, www.GFI.com.

McAfee, McAfee SpamKiller Makes "Intelligent" Decisions About Email With Bayesian Filtering, www.mcafeesecurity.com, 2004.

Friedman, et al, Learning Bayesian Networks from Data, http://ai.stanford.edu/~nir/tutorial/.

Heckerman, A Tutorial on Learning With Bayesian Networks, http://research.microsoft.com/research/pubs/view.aspx?msr-tr-id=MSR-TR-95-06.

Bottcher, Deal: A Package for Learning Bayesian Networks, http://www.jstatsoft.org/v08/iz0updates/deal.pdf.

* cited by examiner

DETECTION AND PREVENTION OF E-MAIL MALWARE ATTACKS

FIELD OF THE INVENTION

The present invention relates to communications systems and methods, and more particularly to communications systems and methods for communicating via e-mail and other messaging technologies. Still more particularly, the present application relates to packet communications systems and methods as are applied for communications via e-mail and other messaging techniques over public or less-than-totally secure packet communications networks, such as the Internet.

BACKGROUND OF THE INVENTION

Well publicized vulnerabilities of public and private packet communications networks to a variety of malicious activity by computer hackers and others have been reported in the technical and business literature—as well as in the popular press. Computer viruses, computer worms and widely experienced e-mail spam are among the most prevalent and potentially most injurious forms of malicious activity perpetrated on unsuspecting computer users.

Perhaps because e-mail spam so universally confronts computer users, this plague of unwanted and often offensive communications has been the subject of much research and experimentation—with a good degree of success. By recognizing the occurrence of certain words and phrases in e-mail header information and message content, it has been possible to intercept and neutralize a wide range of unwanted e-mail. Some particular anti-spam techniques have proven to be of limited use over extended periods of time, however, because of the resourcefulness of increasingly capable spammers in deceiving these anti-spam efforts.

Thus, as in many technological battles, an increase is spamming is faced with an increasing number of tools to combat the flood of e-mail spamming. These tools, in turn, are sought to be avoided or worked around by different particular spam formats, content phrasings, addressing and other techniques. The point-counterpoint battling continues. It is highly desired, therefore, that anti-spam and other anti-malware efforts be self-adapting to changed strategies of spammers and other practitioners of malware distribution.

One approach of many available anti-spam filtering efforts is described in Soonthornphiasaj, et al., "Anti-Spam Filtering: A Centroid-Based Classification Approach," *IEEE ICSP '02 Proceedings*, June, 2002. This technique is applied using weighted word term frequency vector operations on spam e-mail samples and legitimate e-mail samples to yield centroid vectors representative of each class of e-mails. These centroid vectors are then used for similarity comparisons with newly arrived e-mail messages.

Another classifier for determining the likelihood that a received e-mail should be deemed spam or legitimate is described in U.S. Pat. No. 6,161,130 issued Dec. 12, 2000 to E. Horvitz, et al.

Address-based anti-spamming activity is described in U.S. Pat. No. 6,052,709 issued Apr. 18, 2000 to S. Paul, where broadcast alert signals are used to disseminate potential sources of spam once detected at distributed sites in a network. Such address-based anti-spam approaches are sometimes combined with content-based approaches (e.g., using lists of character strings) to provide a multiple-filter technique, as described in U.S. Pat. No. 6,023,732 issued Feb. 8, 2000 to W. B. McCormick, et al.

Often, e-mail spam, when recognized, is removed without actually opening such e-mail, by using a combination of user techniques, as described in U.S. Pat. No. 6,493,007 B1, issued Dec. 10, 2002 to S. P. Pang. Such techniques often require considerable recipient participation, however.

Recently, a new approach has been applied in a number of anti-spamming efforts. This approach is based on long-known Bayesian statistical techniques that are widely used in a variety of statistical applications. In the context of anti-spamming activities, incoming e-mail is filtered using a Bayesian classifier that has learned characteristics of both unsolicited (spam) and legitimate (non-spam) e-mail. Received e-mail is then classified using the Bayesian filter and a determination of probable spam/legitimate status is made and the learning of the classifier is updated.

Another application of Bayesian filter techniques is described in U.S. Pat. No. 6,732,157 B1 issued May 4, 2004 to B. P. Gordon, et al. Bayesian techniques for diagnosis of actual or potential faults in communications networks are described in U.S. Pat. No. 6,076,083, issued Jun. 13, 2000 to M. Baker. Using techniques for deriving and manipulating conditional probabilities for classes of events, the Baker technique seeks to determine probable cause of network faults.

More generally, a class of Bayesian filtering techniques has been developed that is known as Learning Bayesian Networks, as described, for example in a book by that name by R. E. Neapolitan, Prentice-Hall, 2003. A useful tutorial on Learning Bayesian Networks is provided in D. Heckerman, "A Tutorial on Learning With Bayesian Networks," March, 1995, revised November, 1996, available at www.microsoft.com as MSR-TR-95-06 and in numerous other printed publications.

Such Learning Bayesian Networks and related techniques have been widely discussed in the literature, including: I. Androutsopoulos, et al., An Experimental Comparison of Naïve Bayesian and Keyword-Based Anti-Spam Filtering with Personal E-Mail Messages, *Proc. ACM SIGIR* 2000, Athens, Greece, July, 2000, pp. 160-167; C. O'Brien, et al., "Invited workshop on conceptual information retrieval and clustering of documents: Spam Filters: Bayes vs. Chi-Squared; Letters vs. Words" *Proceedings of the 1st international symposium on Information and communication technologies ISICT '03.* September, 2003, pp. 291-296. Other descriptions of Bayesian anti-spam approaches are described in Gary Robinson, "A Statistical Approach to the Spam Problem," *Linux J. vol.* 2003, Issue 107, March, 2003. Sara Sinclair, "Adapting Bayesian Statistical Spam Filters to the Server Side." *Journal of Computing Sciences in Colleges*, Volume 19 Issue 5, May, 2004, pp. 344-346; Le Zhang, Jingbo Zhu, Tianshun Yao, "An Evaluation of Statistical Spam Filtering Techniques." *ACM Transactions on Asian Language Information Processing (TALIP)*, Volume 3 Issue 4, December, 2004, pp. 243-269; Stefan Axelsson, "VizSEC Innovative Visualizations Session: Combining a Bayesian Classifier with Visualisation: Understanding the IDS." *Proceedings of the* 2004 *ACM workshop on Visualization and data mining for computer security*, October, 2004, pp. 99-108.

Commercial products employing Bayesian filtering techniques to detect spam include McAfee SpamKiller, as described at http://www.mcafeesecurity.com. Other such products are offered by GFi, as disclosed in a White Paper entitled "Why Bayesian filtering is the most effective anti-spam technology," at http://www.GFI.COM Other malicious activities encountered by users of communications networks include computer viruses and worms. A representative discussion of mechanisms associated with viruses is presented, for example, in M. M. Williamson, "Throttling Viruses: Restricting propagation to defeat malicious mobile code," *Proc. IEEE 18th Computer Security Applications Conference (ACSAC '02)*, 2002. Computer worms and some of their characteristics are described, for example, in N. Weaver, et al., "A Taxonomy of Computer Worms," *Proc. ACM WORM '03*, Oct. 27, 2003. A common source of infection of computers by viruses and/or worms is received e-mail.

While many of the anti-virus and anti-worm techniques previously employed have been effective to varying degrees in many circumstances, they have not realized the full potential of Bayesian filtering. Nor have prior anti-virus and anti-worm techniques employed the full learning power of Learning Bayesian Networks in exploiting many of the characteristics of viruses and worms that make such malware so potentially devastating.

SUMMARY OF THE INVENTION

In accordance with the teachings of the present invention, disclosed in illustrative embodiments in the following detailed description, the limitations of the prior art are avoided and a technical advance is achieved.

Briefly, in accordance with one aspect of the present invention, Bayesian filtering techniques are applied to the detection and removal of computer viruses and worms by training a Bayesian filter on known legitimate (virus-free and/or worm-free) samples and samples that are known to be virus-corrupted and/or worm-corrupted samples. As with other Bayesian filtering, a decision is not based on specific keywords as it is many anti-spam filters.

Because malicious e-mail messages are a prime source of virus and worm infection, Bayesian filtering is advantageously applied to received e-mail messages in accordance with aspects of the present invention.

The present invention, in another aspect, provides for flagging e-mail messages that are deemed to be suspicious because of particular addressing or other behavior. In accordance with such a determination, these e-mails messages are flagged and forwarded to one or more predetermined sites associated with one or more particular e-mail addresses to permit the suspicious message to be more carefully examined. Advantageously, such further examination is accomplished at an e-mail server or other centralized location having Learning Bayesian Network capabilities. Upon considering the particular contents of a forwarded message a determination may be made that the forwarded message is, in fact, infected with a virus or worm. Whether such a determination is possible upon a particular occurrence will, of course, be dependent the past experience of the Learning Bayesian Network and the particular content or behavior of the forwarded e-mail message. In any event, the forwarded e-mail characteristics are used to update and refine the Bayesian filter used to classify incoming e-mail messages as virus- or worm-infected, or not.

When learning at the Bayesian filter proceeds to a sufficient level of probability of infection for a particular type of suspicious e-mail message —whether such learning is based on message content, address, the incidence of receipt of that type of suspicious message on a sufficient number of occasions over a defined period of time, or otherwise—the filter is in condition to provide classification information about its findings to clients. These clients may be end-user clients, mail server clients or others. Individual clients may interpret information provided by the Learning Bayesian filter about a particular type of e-mail message differently based on other information the client may have. Thus, some clients may chose to block future e-mail messages of the type reported on, and others may pursue different strategies.

In accordance with another aspect of the present invention, the propagation modes employed by viruses and worms is advantageously exploited to further enhance the accuracy and comprehensiveness of classification by the Bayesian filter. More specifically, since viruses and worms received in an e-mail message typically propagate by accessing an e-mail recipient's address book, and then forwarding the infected e-mail to some or all of the e-mail addresses in the recipient's address book, it proves advantageous in accordance with this aspect of the present invention to have the recipient address book contain one or more client-selected target addresses. Thus, by selecting such target addresses to correspond to locations at which a Bayesian filter will be updated by forwarded, potentially infected e-mail, the usual propagation mode of much malware is exploited to its ultimate disadvantage.

BRIEF DESCRIPTION OF THE DRAWING

These and other aspects of the present invention will be more completely understood upon consideration of the following detailed description, taken with the attached drawing figures in which.

DETAILED DESCRIPTION

Figure 1:
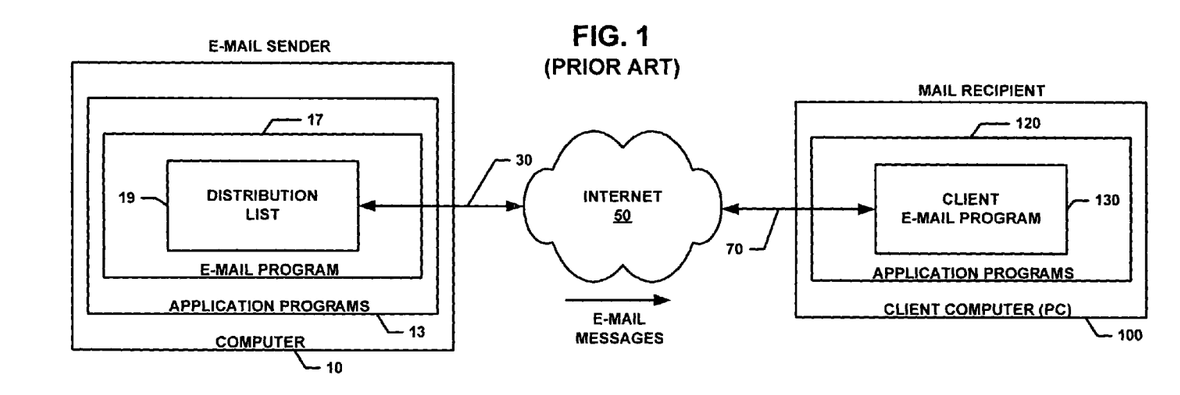
FIG. 1 is a block diagram representation of a prior art public network e-mail delivery system susceptible to infection by e-mail-borne malware.

FIG. 1 is a block diagram representation of a prior art public network e-mail delivery system susceptible to infection by e-mail-borne malware. In particular, FIG. 1 shows an e-mail sender at computer 10 sending e-mail to an e-mail recipient at client computer 100. As is typical in sending e-mail, an e-mail program, shown as 17 in FIG. 1 receives message content and either receives specific e-mail address information from a user at computer 10 or accesses a distribution list 19 to establish destination information for an e-mail. Computer 10 will, of course, generally have other application programs, shown as 13, available for performing a variety of other possible functions. It is assumed, for present descriptive purposes, that an e-mail message is sent from computer 10 over a public or private network, illustratively the Internet 50, to a mail recipient at computer 100. It will be understood that the message from computer 10 may, in general, be sent to a plurality of recipient computers, of which computer 100 is merely representative.

If, by design, inadvertence or otherwise, the e-mail message sent from computer 10 is infected with one or more of a virus, a worm or other maliciously functioning content, and is received by a mail recipient at client computer 100, then this content may well proceed to infect computer 100 in well known fashion. A result of the infection may be the immediate or delayed interference with the functioning of computer 100 or one or more applications programs 120 that are running or available for running on computer 100.

Figure 2:
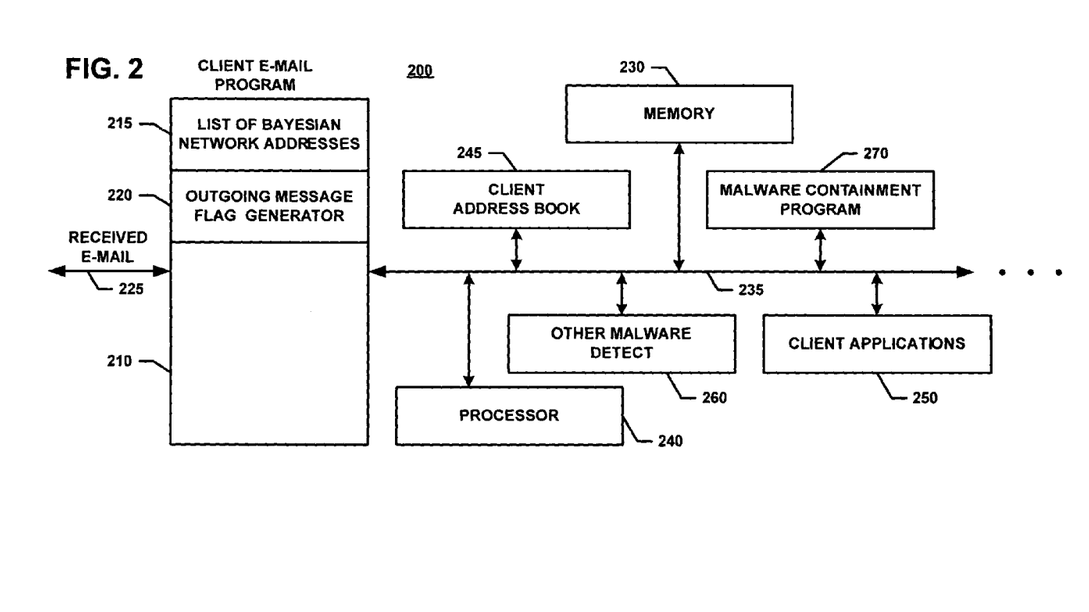
FIG. 2 is a block diagram representation of an e-mail client computer incorporating facilities, in accordance with one aspect of the present invention, for detecting evidence of possible e-mail-borne malware and for communicating such evidence to one or more malware identification servers.

FIG. 2 is a block diagram representation of an e-mail client computer incorporating facilities, in accordance with one aspect of the present invention, for detecting evidence of possible e-mail-borne malware and for communicating such evidence to one or more malware evaluation servers, or malware evaluators. The e-mail client computer of FIG. 2 is seen as receiving incoming e-mail at a client e-mail program 210. Illustratively, a presently received e-mail message is one received from e-mail sender at computer 10 in FIG. 1, though an incoming e-mail may originate from any network source connected to a public or private network represented by the Internet in FIG. 1.

Computer 200 illustratively also includes processor 240, memory 230 (which will typically include both volatile memory and static memory), a client address book 245 (typically stored in memory, such as memory 230), client applications 250 (which may be of various kinds), malware detection hardware/software 260, and malware containment software 270. Malware detection hardware/software 260 may include any of a number of commercial or specially developed malware detection offerings for anti-virus or anti-worm detection for use at client or stand-alone computers, while malware containment software 270 is of a kind offered to destroy or quarantine detected malware. In the context of the present invention, it will often be the case that the malware or suspected malware that is received in e-mail messages is not yet fully recognized as a threat. That is, a download of current definitions or rules for known threats from a commercial provider of anti-malware software may not yet include sufficient information to effectively deal with the particular threat. In short, receipt of actual malware of sufficient sophistication will, in all likelihood, infect a client computer such as computer 200 in FIG. 2. However, while a computer subject to e-mail-borne malware threats may not be able to successfully deter any infection, it may be able to limit some aspects of the infection, and it will generally be able to discern certain patterns of behavior that will be useful in inhibiting worst-case proliferation of the malware and may ultimately contribute to tools, rules and definitions for limiting future infection.

Figure 3:
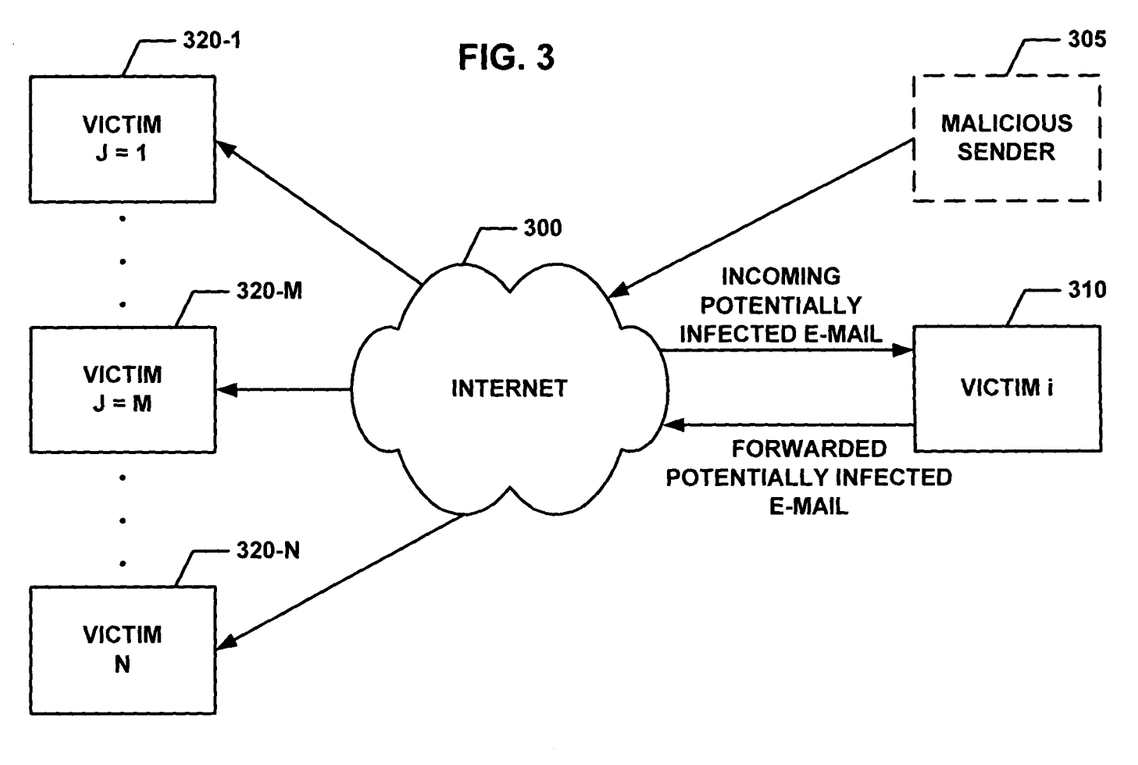
FIG. 3 shows a high-level representation of a network that can facilitate the propagation of malware.

When a received e-mail message is infected with malware, a number of possible adverse consequences may occur, but one typical result of receiving an e-mail message bearing malware (hereinafter, a malware message) is that the received message will tend to replicate itself by seeking to be copied and forwarded to one or more other computers. In typical fashion, a received malware message will access a client address book or other address-bearing resources—such as recently sent messages, lists in other application programs, and the like—and send a copy of itself to some or all of the addresses in said address-bearing resources. This process is illustrated in FIG. 3, where a recipient (styled Victim i) of a potential malware message from potentially malicious sender 305 is shown forwarding this message to one or more other locations shown as Victim J1, Victim J2, . . . , Victim JM, . . . , Victim JN. It should be borne in mind that the term Victim in FIG. 3 actually means potential Victim, until a further analysis is performed in the network, as will be described in the sequel. FIG. 3 is, without more, a network that can inadvertently promote the distribution of malware messages.

Figure 4:
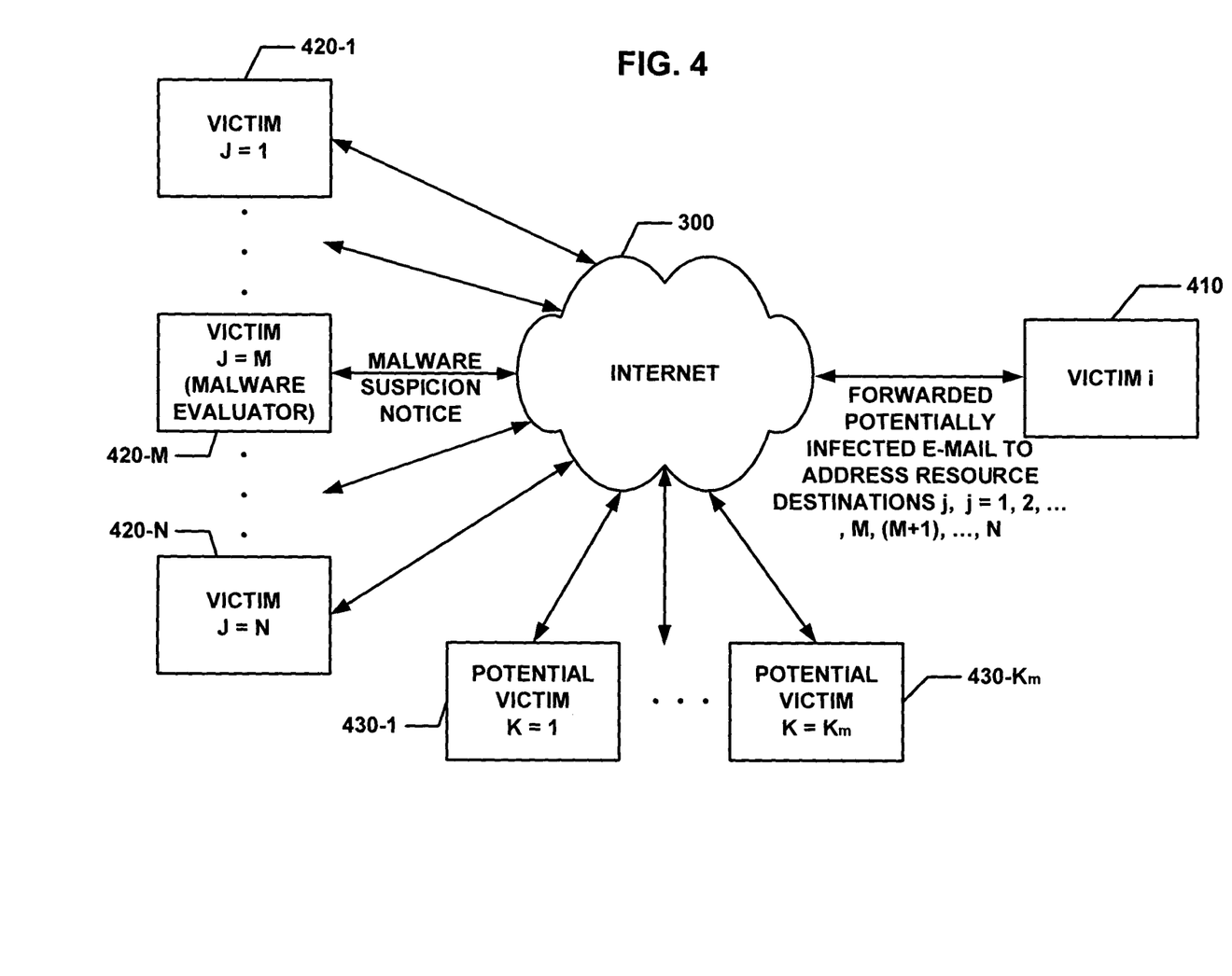
FIG. 4 shows how the network of FIG. 3 is modified in accordance with embodiments of the present invention to develop information at a malware evaluator regarding the presence of malware in the network and provide such information to client locations.

FIG. 4 shows how the network of FIG. 3 is modified in accordance with embodiments of the present invention to develop information at a malware evaluator regarding the presence of malware in the network and provide such information to client locations. More particularly, the arrangement of FIG. 3 is modified to provide for the use of one or more addresses for directing mail to one or more specified malware evaluator locations, such as 420-M in FIG. 4. Malware evaluators are advantageously arranged to include a learning unit, illustratively a Learning Bayesian Network of a type generally well known for learning-based on training data and received e-mail messages. Learning units of this type are presently directed to learning how to classify received e-mail messages into spam and non-spam messages, as described in publications described above. In the present application, however, such Learning Bayesian Networks (or other learning units) are adapted by different particular training data to classify received input e-mail messages into malware messages and non-malware messages. Though use of learning units may include learning for purposes of identifying spam, embodiments of the present invention are primarily focused on identifying viruses, worms and other more uniformly malicious and harmful malware.

As applied in the network illustrated in FIG. 4, such Learning Bayesian Networks receive e-mail from locations such as (potential) Victim i 410 in FIG. 4 and other such e-mail recipients who have forwarded received e-mail messages to locations, such as 420-j in FIG. 4, associated with one or more address resources available to the recipient 410. By reason of receiving these forwarded messages, a malware evaluator, such as 420-M, treats each as a suspicious message, such as a potential malware message that has replicated itself and used address resources available at a potential victim location such as 410 to forward a copy of itself to any number of locations.

It might well be, though, that a recipient such as that at computer 410 in FIG. 4 employed some automatic or manual means to otherwise develop a suspicion that a received message might be a malware message. Thus, for example, an observed processing stack overflow characteristic of some computer worms might be detected by well known malware detection means at a recipient location. This event, following the receipt of an e-mail message within some predetermine period, and possibly taken in combination with other events or malfunctions transpiring at a recipient location such as 410 in FIG. 4, will illustratively be sufficient cause for the recipient location to forward the received message to a malware evaluator such as 420 as suspicious. By what means, exactly, a message was forwarded to a malware evaluator is not necessarily important; the purpose of the malware evaluator is to process suspicious received e-mail messages of any kind and to derive a classification of such received messages into malware messages or non-malware messages.

In any event, it proves advantageous for a client forwarding a suspected malware e-mail to a malware evaluator to flag the message by appending one or more bits of information, e.g., in a header portion of the message, as it is forwarded to the malware evaluator. In some cases, such flagging may prove superfluous; receipt of an e-mail message at a malware evaluator may itself be interpreted as an indication that the message is suspicious. Flagging with particular information, e.g., an indication that a stack overflow occurred at the potential-victim location may prove useful at the malware evaluator to better classify received e-mail messages.

Accordingly, client e-mail program 210 is shown in FIG. 2 to include outgoing message flag generator 220. Flag generator 220 illustratively receives information, including an attempt by a received e-mail message to access client address book 245 (or other address resources) for forwarding the received message, and other indications of possible malware infection, and to append one or more flags to a resulting outgoing message. If additional information, such as a stack overflow indication or other behavior typical of malware infection, is detected at the receiving client location, then additional information of that event is also advantageously provided by such appended flag(s) as the message is being forwarded to the malware evaluator. Of course, in many cases involving actual malware, the evaluator will receive the forwarded message because the received (malware) message itself accessed address resources at the recipient location to determine one or more addresses that included the address of a malware evaluator.

It will be appropriate in some applications of the present invention for a malware evaluator to also employ a threshold beyond which a simple suspicion is deemed a high likelihood that a particular type of received message is a malware message. Alternatively, or equivalently, a malware evaluator will develop a degree of certainty or a probability that a particular type of message is malware (or not) and supply such information to network clients and others along with characteristics of the offending malware.

As shown in FIG. 4, a message forwarded by a potential victim at computer 410 may well arrive at computers 420-J, J=1, 2, . . . , N, where N can be a large number. And, of course, a typical one of these recipients of a forwarded message may well forward that message to a large number of additional locations, and so forth, until a true epidemic might ensue. However, if a number of infected recipients of forwarded messages further forward them to a malware detector such as 420-M in FIG. 4, the malware evaluator may quickly determine that a malware message is being propagated. Upon such a determination, the classification of a message having prescribed characteristics of the detected malware message is advantageously forwarded by malware detector 420-M to each of a plurality of clients, including original victim I at computer 310, and the victims at 420-J, where J=1, 2, . . . , N (other than potential victim M, the malware evaluator 420-M). Malware evaluators such as 420-M are advantageously programmed to permit evaluation of a received message with a reduced likelihood of themselves being infected if the received message should be a malware message. Thus, for example, received e-mail messages at malware evaluators will advantageously use quarantine and other limitations on processing to permit only Bayesian or other classifying operations. Such infection avoidance techniques will in some embodiments of the present invention include reference to training and signature data (for known malware) to contain the effects of received e-mail messages. Thus, though computer 420-M may receive the same suspicious e-mail messages as the other illustrative computers 420-j, it will be less likely to itself become infected.

In any event, access to any address resources at malware evaluators, such as 420-M in FIG. 4, is advantageously arranged to be highly secure from use by received messages. So, the malware evaluators will desirably not further propagate an infected message. In addition to providing malware warning information to those victim computers 420-j (and to victim 410) that provided e-mail messages that malware evaluator 420-M finds to be infected message from victim 410, malware evaluator 420-M may also provide preventative information to clients such as 430-K, K=1, 2, . . . , Km, where Km may be a large number of client computers. Here, clients 430-K represent clients that have not yet received e-mail messages found by a malware evaluator, such as 420-M to include malware.

Figure 5:
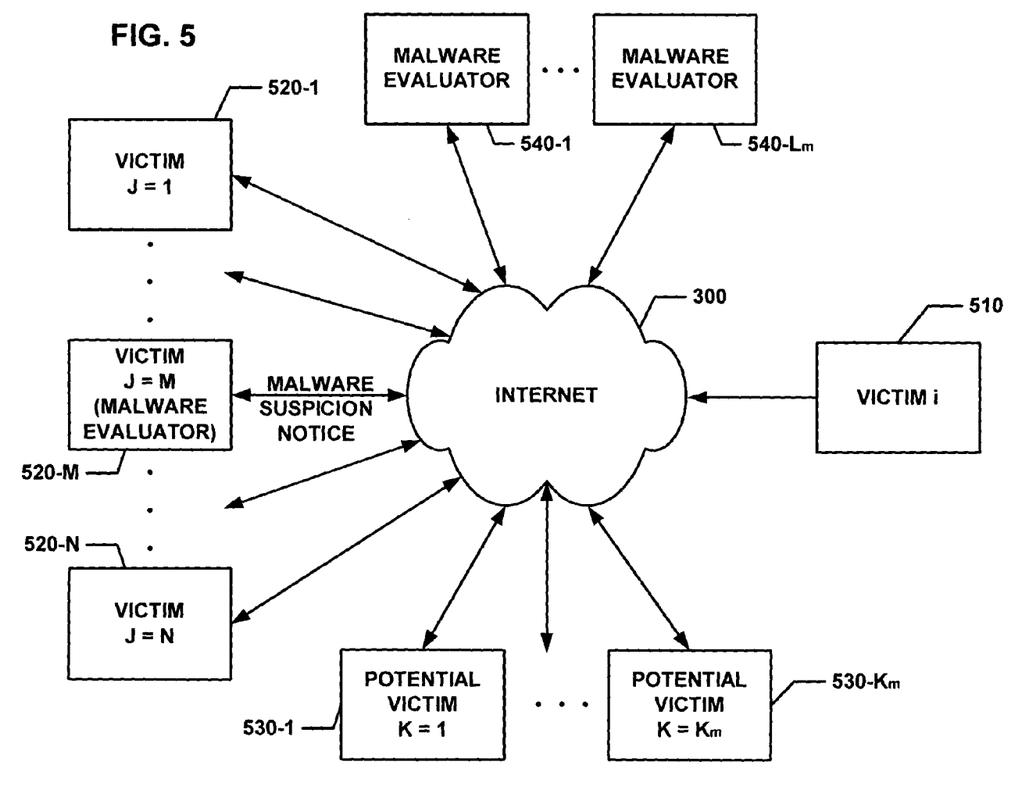
FIG. 5 shows how the network of FIG. 4 is expanded to share information about potential malware infections between a plurality of malware evaluators.

FIG. 5 shows how the network of FIG. 4 is expanded to share information about potential malware infections between a plurality of malware evaluators. In particular, FIG. 5 shows malware evaluators 540-L, L=1, . . . , Lm, where Lm is an integer greater than 1. Each of the malware evaluators 540-L (and 420-M) is arranged to receive information from potential victims at computers such as 510, 520-J and other client computers. Moreover, malware evaluators 540-L (and 420-M) advantageously share results with others who may not have received the same, or as many, forwarded e-mail messages, and so would not be in condition without more to advance its learning to classify received e-mail messages as malware messages or not.

It will be readily recognized that the use of one or more malware evaluators 540-L may be used to advantage in a corporate network having computers at a plurality of corporate locations, or such malware evaluators may be provided at one common location (or a distributed plurality of locations) to serve subscription clients receiving potential malware messages and wishing to contribute to a common avoidance or containment of a class of malware messages.

Figure 6:
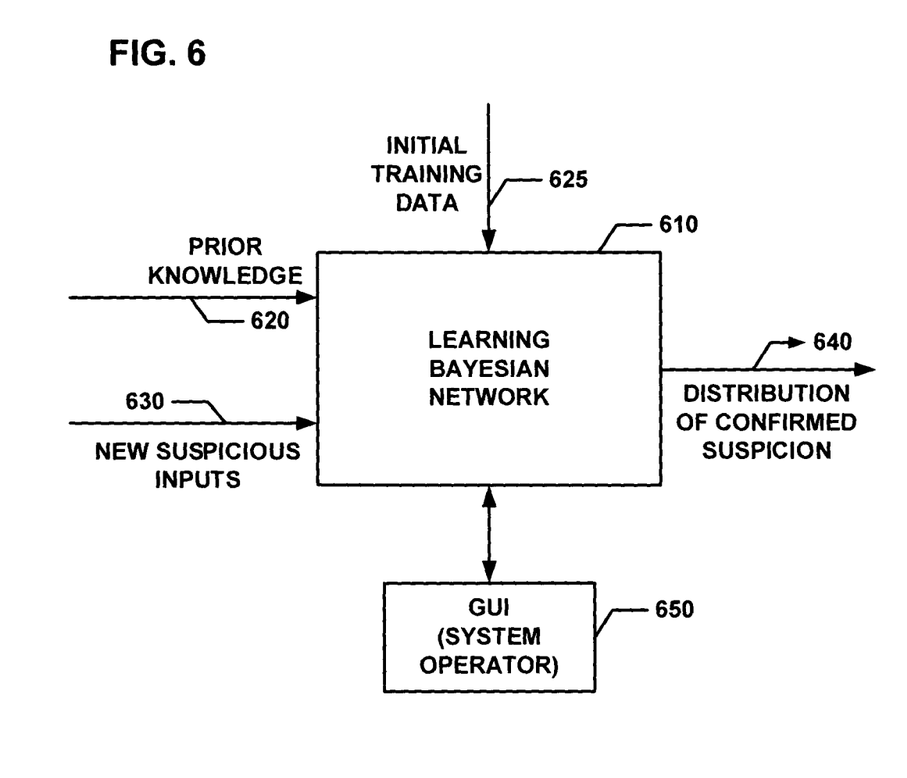
FIG. 6 is a representation of a Learning Bayesian filter known in the art for anti-spam applications, among many others, and applied in accordance with aspects of the present invention to learning—from original training data and updates derived from other sources, including received e-mail messages—sufficient to make a determination regarding the likelihood that e-mail having observable characteristics should be classified as malware of one or more particular types.

FIG. 6 is a representation of a Learning Bayesian filter known in the art for anti-spam applications, among many others, and applied in accordance with aspects of the present invention to learning—from original training data and updates derived from other sources, including received e-mail messages—sufficient to make a determination regarding the likelihood that e-mail having observable characteristics should be classified as malware of one or more particular types. The Learning Network 620 may also receive inputs from other particular malware evaluators, illustrated in FIG. 5 as 540-L and described above. These inputs from other malware evaluators are, for purposes of simplicity of description, included with inputs on the prior knowledge input 620 in FIG. 6. FIG. 6 also shows an illustrative GUI interface, such as a user terminal or system monitor to permit a system operator to enable system inputs and outputs, or to otherwise control operation of the learning network 610 and, as appropriate, other elements of malware evaluators such as 540-L or 520-M described above.

As noted above, the Learning Bayesian Networks field has been the subject of considerable publication, discussion and application to a variety of real-world problems. In addition to the Neapolitan and Heckerman tutorial materials cited above, the cited application techniques, and the many cited commercial offerings, another useful document that will be familiar to those skilled in application of Learning Bayesian Networks is "Learning Bayesian Networks from Data," a slide presentation by N. Friedman and M. Goldszmidt, available at http://ai.stanford.edu/~nir/tutorial. Further, the deal software package, described in the paper: deal: A package for Learning Bayesian Networks, by Susanne G. Bottcher and Claus Dethlefsen, appearing at http://www.jstatsoft.org/v08/i20/updates/deal.pdf, may be downloaded under the terms of the GNU General Public License from http://www.math.aau.dk/novo/deal/source/. A user's manual for deal is available at http://www.math.aau.dk/novo/deal/source/dealmanual.pdf. As described in the above-cited deal: A package for Learning Bayesian Networks paper, the deal package may be interfaced with the well-known hugin commercial software described, for example at http://www.hugin.com for additional inference processing. Further information about the deal package is available at the Web site of author Dethlefsen at http://www.math.aau.dk/novo/deal/. Another software package that will provide a preferred Bayesian filter is crm114 in combination with a standard Unix procmail facility. See, for example, http://crm114.sourceforge.net.

Figure 7:
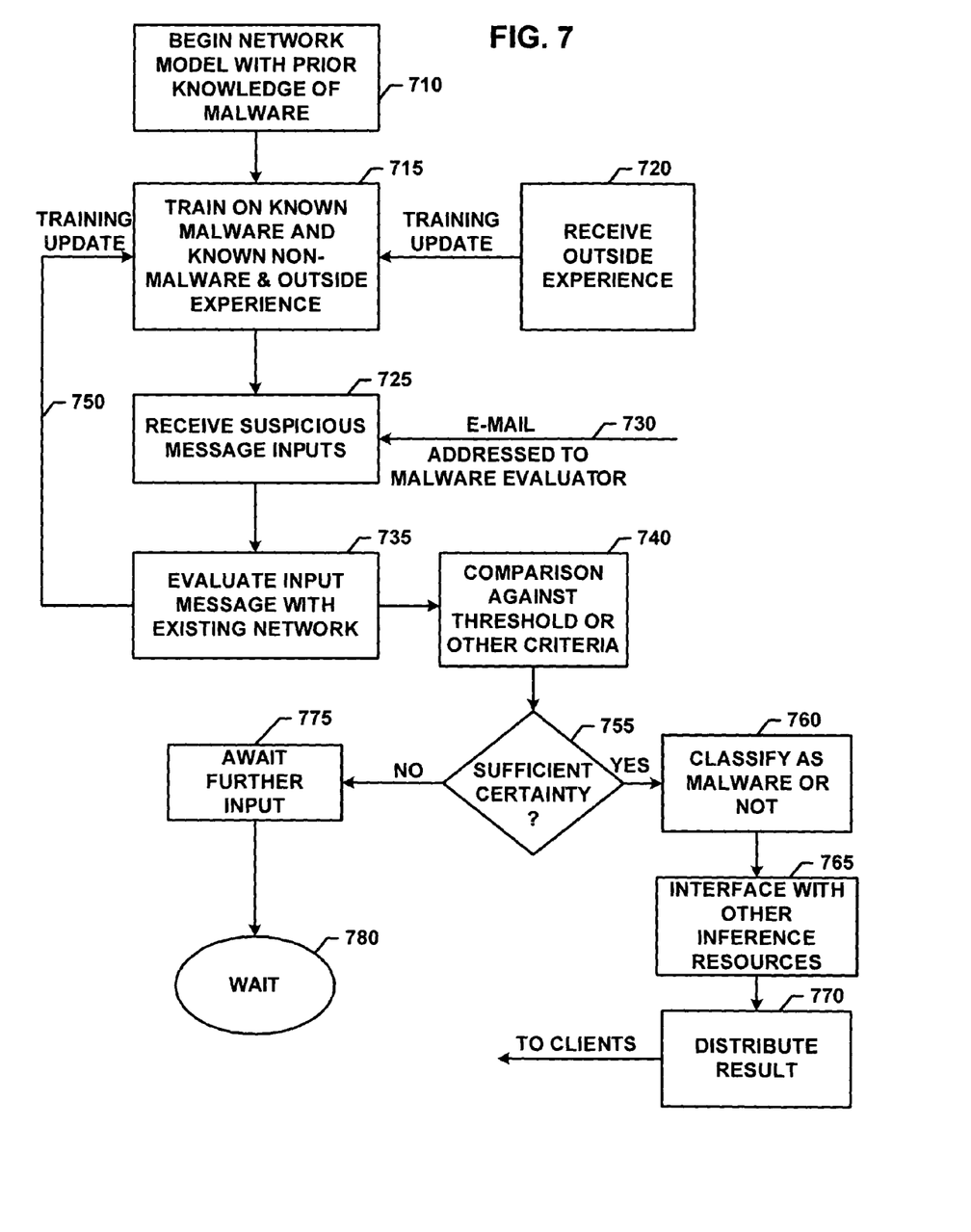
FIG. 7 is a flowchart representation of illustrative methods practiced in accordance with embodiments of the present invention.

FIG. 7 is a flowchart representation of methods practiced at a malware evaluator in accordance with an illustrative embodiment of the present invention. More particularly, the Learning Bayesian Network of FIG. 6 is trained in standard fashion based on prior knowledge of the structure and organization of targeted malware, as indicated at 710 in FIG. 7. Further training on actual examples of known malware and known non-malware (i.e., messages known not to contain malware) is applied as indicated at 715 in FIG. 7. Such training is upgraded, and the learning by the network enhanced, by receiving the results of evaluation information produced by other outside evaluators, such as evaluators 540-L as indicated in FIG. 5 and described above. Suspicious e-mail messages forwarded by client locations experiencing behavior consistent with the presence of malware in received e-mail messages is then received (725) at the malware evaluator on input 730 and these inputs are evaluated by the Learning Bayesian Network at 735 as indicative of the presence of malware. This evaluation, whether conclusive or not, is fed back to the training step at 715 to further update the network model. If a comparison at step 740 of the evaluator output from step 735 (in relation to defined threshold values or other criteria) provides sufficient certainty to allow a classification of the received message as malware or not (a YES result at test 755), then a classification is made at 760. This classification may optionally be further refined or modified at step 765 by inference functionality such as the above-described hugin software before distribution of usable results at 770. Once the requisite level of certainty is determined at step 755, the result sent to clients will typically be a malware-present indication or a malware-not-present indication. These results may be provided to other malware evaluators, to corporate or other institutional users for control over e-mail servers, or to end-user clients. An example of the latter case is an update of definitions or rules by means of which malware detection software, such as 260 in FIG. 2 will treat future incoming e-mail messages. Additionally or alternatively, output results of processing illustrated in FIG. 7 may be used by malware containment software 270 shown in FIG. 2 as present at client locations to treat infections that have already occurred at these locations. While not shown in FIG. 7, interim results, e.g., indicating that an e-mail message (or a particular e-mail message) is under evaluation may be sent to the computer forwarding (knowingly or unknowingly) an e-mail to a malware evaluator such as 420-M. Such information, even if not certain, may prove useful at a potential victim computer (such as 410) that has forwarded a suspicious e-mail to a malware evaluator. The potential victim may, for example, undertake measures for mitigation of possible harm or prevention of further infection.

From the foregoing descriptions it will be clear that including one or more flags with messages forwarded from a recipient of a message, e.g., victim 410 in FIG. 4, to the computers 420-j will inform a malware evaluator, e.g., 420-M of a suspicion that the forwarded message contains malware. Further, the flagged message sent from 410 in FIG. 4, will also be received at illustrative recipient 420-1 with the same flags. So, a client such as 420-1 receiving a flagged, forwarded message will have information indicating that the received message is doubly suspicious. That is, the received e-mail message is under suspicion by reason of the received flag(s), and further by reason of actual or attempted forwarding of the message from illustrative client 420-1 after accessing address resources at client 420-1. Further, if a client such as 420-1 receiving a doubly suspicious message then forwards this message to a malware evaluator such as 420-M, then that evaluator will have enhanced information of malware-like behavior exhibited by the forwarded message. Of course illustrative forwarding client 420-1 may add further flags indicative of other malware-like behavior of messages forwarded from client 420-1—both to evaluators like 420-M and clients who are associated with address resources (e.g., address book entries).

It will also be recognized that while FIG. 2 shows a list of Bayesian Network addresses as a separate entity 215, it will generally be advantageous to have this network address information included in the normal address book or other address resources of an e-mail client. Then, any (potential or actual) malicious e-mail messages cannot readily distinguish the address for one or more malware evaluators from other network addresses routinely included at a computer.

While the foregoing descriptions have been based on typical computer network arrangements incorporating the present inventive features and functions, it will be clear to those skilled in the art that the present inventive teachings will be applicable to a variety of fixed and mobile network communications devices including cell phones, portable media devices and the like. Many of such devices include address books or their equivalents, and ever-evolving techniques employed by malicious hackers and other malefactors will seek to exploit any vulnerability in networked systems. It should be understood that present inventive techniques will find application in a broad range of messaging contexts, including voice messaging, instant messaging, and voice-over-IP messaging. Advantages of many embodiments and applications of the present teachings are achieved by exploiting use at a first message recipient device or system of malicious messages of various kinds to attempt to propagate malicious content to others using the address resources of the first recipient device or system. When these attempts include sending a message to one or more malware evaluator locations, or to other locations that forward malicious messages to one or more malware evaluator locations, the present inventive techniques can learn sufficient information to classify messages as malicious.

Other aspects of system or device behavior within the present inventive teachings include detecting an event, such as the execution of a particular program or function, at a message-recipient device or system. If the event can be associated with the receipt of a particular message, and if the event is identifiable as being of a potentially malicious kind, then embodiments of the present invention will be useful to identify the message as potentially malicious. So, for example, a change to a registry key might be innocuous in the general case, but suspect if done at the behest of a program running as the result of receiving or reading an email message. Such detailed suspicious behavior also proves useful in supplying flag information to a malware evaluator or another potential victim.

The present inventive technique of causing potential malware messages to self-report their presence, e.g., by causing an e-mail message to be forwarded to a malware evaluator, will find application in other contexts. While a Bayesian Learning Network has been described as a useful malware evaluator element, other particular learning systems may be used as well.

In some embodiments of the present invention, malware evaluators such as 420-M are advantageously programmed to permit evaluation of a received message with a reduced likelihood of themselves being infected if the received message should be a malware message. Thus, for example, received e-mail messages at malware evaluators will advantageously use quarantine and other limitations on processing to permit only Bayesian or other classifying operations to be performed with respect to received messages. Further propagation of any actual malware is also advantageously contained by limiting the type of access by received e-mail to address books or other address resources. When it proves useful to allow access to address resources, it will nevertheless prove advantageous to limit the use of any address information, as by inhibiting actual transmission of messages under the control of received e-mail messages.

What is claimed is:

1. In a packet network for selectively communicating messages between a plurality of messaging clients, said messaging clients comprising a first network malware evaluator conditioned by training to learn characteristics of malware messages, a method practiced at said first network malware evaluator, the method comprising
  accepting received messages from at least one other of said messaging clients, said received messages being suspected of containing malware, said received messages comprising forwarded messages from at least one other of said messaging clients, at least some of said forwarded messages received at said first network malware evaluator comprising flagged information indicative of suspicious malware content,
  updating said training at said first network malware evaluator in response to said received messages at said first malware evaluator, and
  when said first network malware evaluator achieves a level of training sufficient to allow a classification of messages received at said first malware evaluator with a predetermined likelihood, generating a classification indication for at least selected ones of said received messages, the classification indication selected from the group of classification indications comprising (i) a malware-present indication, and (ii) a malware-not-present indication.

2. The method of claim 1, wherein said training comprises
  configuring said first network malware evaluator to reflect prior known characteristics of malware messages, and
  applying messages that are known to not be malware messages to said first network malware evaluator.

3. The method of claim 1 wherein said first network malware evaluator comprises a Learning Bayesian Network.

4. The method of claim 1 wherein said flagged information is indicative of a message received at said first malware evaluator having been forwarded from a messaging client by action of a received message at said client.

5. The method of claim 3 wherein said flagged information is indicative of a message received at said first malware client evaluator having been forwarded from a messaging client by reason of
  said forwarded message having been received at said client, and
  said client having detected actions at said client that are consistent with the presence of malware.

6. The method of claim 1 wherein said packet network comprises at least a second malware evaluator, and wherein said updating of training at said first malware evaluator further comprises updating in response to classification information received from said at least a second malware evaluator, said updating classification information based on training accomplished at said at least a second malware evaluator.

7. The method of claim 1 wherein said classification information derived at said first malware evaluator for at least selected ones of said messages received at said first malware evaluator comprises a likelihood indication for said derived classification of said message.

8. The method of claim 1, further comprising
  when said first network malware evaluator has not achieved a level of training sufficient to allow a classification of messages received at said first malware evaluator with at least a predetermined likelihood, selectively sending messages to at least one of said other clients indicating that a selected one of said received messages is under evaluation for possible malware content.

9. In a packet network for communicating messages between a plurality of messaging clients, a method practiced at a first messaging client comprising
  accepting a received message forwarded from a forwarding network location, the received message having a flag indicating that the forwarding network location has a suspicion that said received message has been infected by malware,
  detecting behavior consistent with infection by malware related to said received message, and
  appending a further flag to any messages forwarding said received message to another network destination, thereby generating flagged messages, said further flag being indicative of a suspicion that said flagged messages are suspected of being infected by malware.

10. The method of claim 9 wherein said detecting behavior consistent with infection by malware comprises detecting an attempt by said received message to access addressing resources at said first messaging client.

11. The method of claim 10 wherein said appending a further flag to any messages sent from said first messaging client comprises appending said further flag to messages sent to network destinations associated with said detected attempt to access addressing resources.

12. The method of claim 9 wherein said detecting behavior consistent with infection by malware comprises detecting the presence of said flag in said received message.

13. The method of claim 9 wherein said detecting behavior consistent with infection by malware comprises detecting the occurrence of a stack overflow at said first messaging client.

14. The method of claim 10 wherein said addressing resources comprises addresses corresponding to one or more malware evaluators.

15. The method of claim 14 wherein said forwarding comprises forwarding the received message to a malware evaluator having a network address included in said addressing resources.

16. The method of claim 15 wherein said forwarding the received message to a malware evaluator comprises a request to the malware evaluator to classify the forwarded message with respect to infection by malware.

17. The method of claim 15 wherein said appending a further flag to any messages forwarding said received message to another network destination comprises at least one flag identifying the detection of at least one behavior consistent with infection by malware.

18. The method of claim 9 wherein said appending a further flag to any messages forwarding said received message to another network destination, comprises appending a further flag indicative of a suspicion that said flagged messages are suspected of being infected by a malware having at least one specific characteristic.

* * * * *